United States Patent
Stack, Jr.

(10) Patent No.: US 11,649,101 B2
(45) Date of Patent: May 16, 2023

(54) SYSTEM AND METHOD OF MANUFACTURE FOR FLUID CONTAINER WITH CHECK VALVE

(71) Applicant: Steven Michael Stack, Jr., Watertown, CT (US)

(72) Inventor: Steven Michael Stack, Jr., Watertown, CT (US)

( * ) Notice: Subject to any disclaimer, the term of this patent is extended or adjusted under 35 U.S.C. 154(b) by 113 days.

(21) Appl. No.: 17/031,797

(22) Filed: Sep. 24, 2020

(65) Prior Publication Data

US 2021/0086973 A1 Mar. 25, 2021

(51) Int. Cl.
*B65D 81/05* (2006.01)
*F16K 15/14* (2006.01)
*F16K 15/20* (2006.01)

(52) U.S. Cl.
CPC .......... *B65D 81/052* (2013.01); *F16K 15/147* (2013.01); *F16K 15/202* (2013.01)

(58) Field of Classification Search
CPC ..... B65D 81/052; F16K 15/144; F16K 15/20; F16K 15/202; B29D 22/02; Y10T 137/3584
See application file for complete search history.

(56) References Cited

U.S. PATENT DOCUMENTS

| | | |
|---|---|---|
| 4,708,167 A | 11/1987 | Koyanagi |
| 5,209,264 A | 5/1993 | Koyanagi |
| 5,927,336 A | 7/1999 | Tanaka et al. |
| 6,378,552 B1 * | 4/2002 | Pekar ............... A61B 17/135 128/DIG. 20 |
| 6,629,777 B2 | 10/2003 | Tanaka et al. |
| 6,827,099 B2 | 12/2004 | Tanaka et al. |
| 7,201,273 B2 | 4/2007 | Chen et al. |
| 7,533,772 B2 | 5/2009 | Yoshifusa et al. |
| 8,277,910 B2 | 10/2012 | Koyanagi et al. |
| 8,911,340 B2 | 12/2014 | Zhang et al. |
| 9,199,596 B2 | 12/2015 | Zhang et al. |
| 9,199,597 B2 | 12/2015 | Zhang et al. |
| 9,725,066 B2 | 8/2017 | Zhang et al. |
| 10,173,822 B2 | 1/2019 | Zhang et al. |
| 10,328,892 B2 | 6/2019 | Zhang |
| 2002/0166788 A1 * | 11/2002 | Sperry ............. B29C 66/81431 383/3 |
| 2003/0108699 A1 * | 6/2003 | Tanaka ................. B65D 81/052 428/35.2 |
| 2007/0053615 A1 * | 3/2007 | Liu ........................ B65D 31/04 383/3 |

(Continued)

*Primary Examiner* — Hailey K. Do
(74) *Attorney, Agent, or Firm* — Nicholas E. Blauton; Damian Wasserbauer; Wasserbauer Law LLC

(57) ABSTRACT

A fluid container has a first and second flexible membrane forming at least one chamber, a channel configured to receive pressurized inert gas, and one or more check valve assemblies disposed therebetween. The one or more check valve assemblies is formed from a continuous third flexible membrane folded at an apex, and configured to provide the flow of pressurized fluid in one direction upon inflation, from the channel to the at least one chamber, while restricting flow in the opposite direction. The one or more check valve assemblies are characterized in that they do not require pre-printing or electronic registering, thus allowing for an inflation flow rate of at least twice that of conventional inflatable packaging systems.

8 Claims, 14 Drawing Sheets

(56) References Cited

U.S. PATENT DOCUMENTS

| | | | |
|---|---|---|---|
| 2008/0005846 A1* | 1/2008 | Liao | B65D 81/052 5/713 |
| 2008/0044109 A1* | 2/2008 | Liao | B65D 81/052 383/3 |
| 2008/0095474 A1* | 4/2008 | Liao | B65D 81/052 383/3 |
| 2008/0118680 A1* | 5/2008 | Liao | B65D 81/052 428/34.1 |
| 2011/0266191 A1* | 11/2011 | Im | B65D 81/052 206/584 |
| 2016/0039592 A1 | 2/2016 | Zhang et al. | |
| 2016/0137156 A1 | 5/2016 | Zhang et al. | |
| 2017/0369224 A1* | 12/2017 | Wang | B29C 65/72 |

* cited by examiner

SYSTEM AND METHOD OF MANUFACTURE FOR FLUID CONTAINER WITH CHECK VALVE

TECHNICAL FIELD

The present invention relates to containers, packaging elements, and packages specially adapted to protect contents from mechanical damage through the use of inflatable elements filled with fluid.

BACKGROUND OF THE INVENTION

Numerous industries today use inflatable packaging systems as a way to cushion and protect their goods from being damaged during the shipping process. These packaging systems are typically made from flat sheets of thermoplastic, which are layered and joined together to form roll stock. The sheets are typically oriented one on top of the other, then joined by heat sealing along the periphery and at various locations within the periphery to form design features therein. Once formed, roll stock may be further modified to ensure that the packaging system adequately conforms to the size and shape of a particular good, once the packaging system is inflated and made ready for shipping. This approach allows conventional packaging systems to meet the size and shape requirements of a variety of goods, such as consumer electronics, glassware, printer cartridges, and other products that are fragile or otherwise prone to damage during shipping.

Conventional inflatable packaging systems exhibit similar structural features. In particular, conventional designs are characterized by a linear array of cylindrically-shaped, inflatable chambers, and one or more check valves positioned at the opening of each chamber. The inflatable chambers may include openings to allow fluid communication between adjacent chambers, or alternatively, the chambers may be formed to hold fluid independently from one another. The check valves physically separate the opening of each inflatable chamber from a common inflatable channel. When the packaging system is inflated, the common inflatable channel receives pressurized fluid at one end of the channel and uniformly distributes that fluid to each chamber through the valves. The valves are generally purposed to restrict the flow of fluid to one direction, effectively allowing fluid to enter, but not escape from, each air chamber. A variety of check valve designs are known in the art; these valves are typically defined by additional layers of plastic that form a path for fluid to flow from the channel to each chamber, and further defined by localized features introduced within that air path to direct, restrict, or otherwise control, the flow of fluid through the valve. The localized features are typically pre-printed, which involves applying thermally-resistant paint at predetermined locations on a plastic sheet, prior to applying heat, so that thermal bonding occurs in certain areas and not in others. These structural features, as well as others, are formed during the manufacturing process that results in roll stock.

FIG. 1 provides a plan view of a conventional inflatable packaging system 10, representative of the prior art, having an inflation channel 11, a check valve body 12, and a plurality of linear-arrayed fluid chambers 13. Packaging system 10 is formed from first and second layers 18, 19. Fluid chambers 13 are separated by side portions 14. Check valve body 12 includes localized features 15a, 15b, 15c, and 15d, which restrict fluid flow to one direction through the valve body 12. Each fluid chamber 13 is further characterized by a top 16a and a bottom 16b. Additionally, conventional inflatable packaging system 10 includes a continuous seal 16 that connects top 16a to one or more layers 18, 19.

Several problems exist with check valves used in conventional inflatable packaging systems. First, the pre-printed, localized features forming the valve must be electronically registered so that they align precisely to each inflatable chamber and to related components. Several factors contribute to misalignment during the manufacturing of roll stock; for example, heat sealing results in plastic deformation and the associated expansion and contraction of the sheets. Conventional designs are therefore subject to improper registration, rendering misaligned valves inoperative. Second, pre-printing requires specialized forming equipment, which would otherwise not be necessary. Third, conventional check valve designs significantly restrict fluid flow through the valve; fluid flow is particularly restricted at the valve inlet, where heat sealing elements are required to properly form the connection between the inflatable channel, the check valve, and the air chamber. This restricted flow results in longer times needed to fill the inflatable packaging system.

SUMMARY OF THE INVENTION

The disadvantages of the prior art related to conventional inflatable packaging systems are solved by an apparatus, system and method according to the invention.

It is an object of the present invention to eliminate the need for pre-printing check valve features used to make conventional roll stock, resulting in a simpler manufacturing process and an inflatable packaging system that is less prone to failure and inoperability associated with misplaced check valve features.

It is an object of the present invention to eliminate the need for specialized equipment required to electronically register pre-printed valve features, resulting in a simpler manufacturing process and a lower capital cost needed for manufacturing equipment.

It is an object of the present invention to provide an inflatable packaging device that inflates at least twice as fast as (or in at most half the time as) conventional packaging systems, afforded by a check valve design that accepts a higher flow rate than its conventional equivalent.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
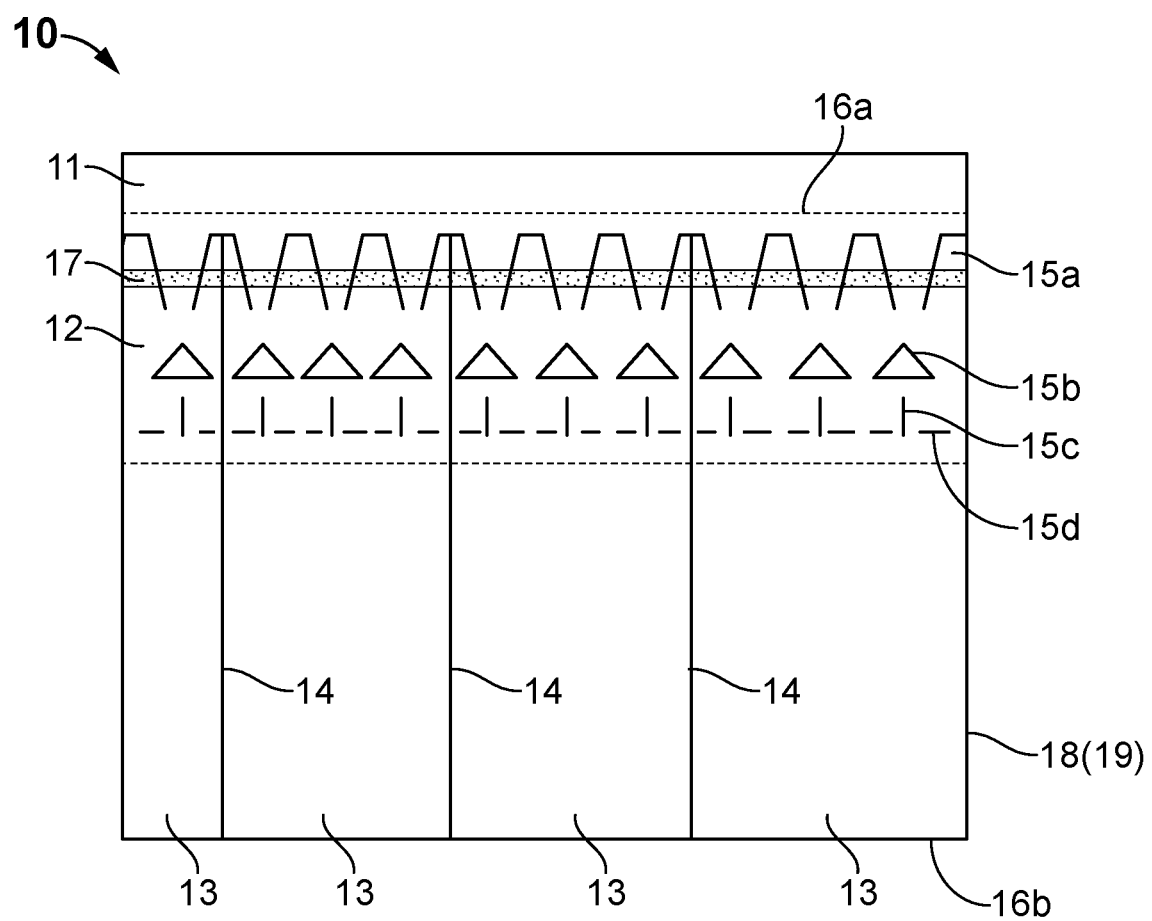
FIG. 1 illustrates a plan view of a conventional inflatable packaging systems in accordance with the prior art.
Figure 2:
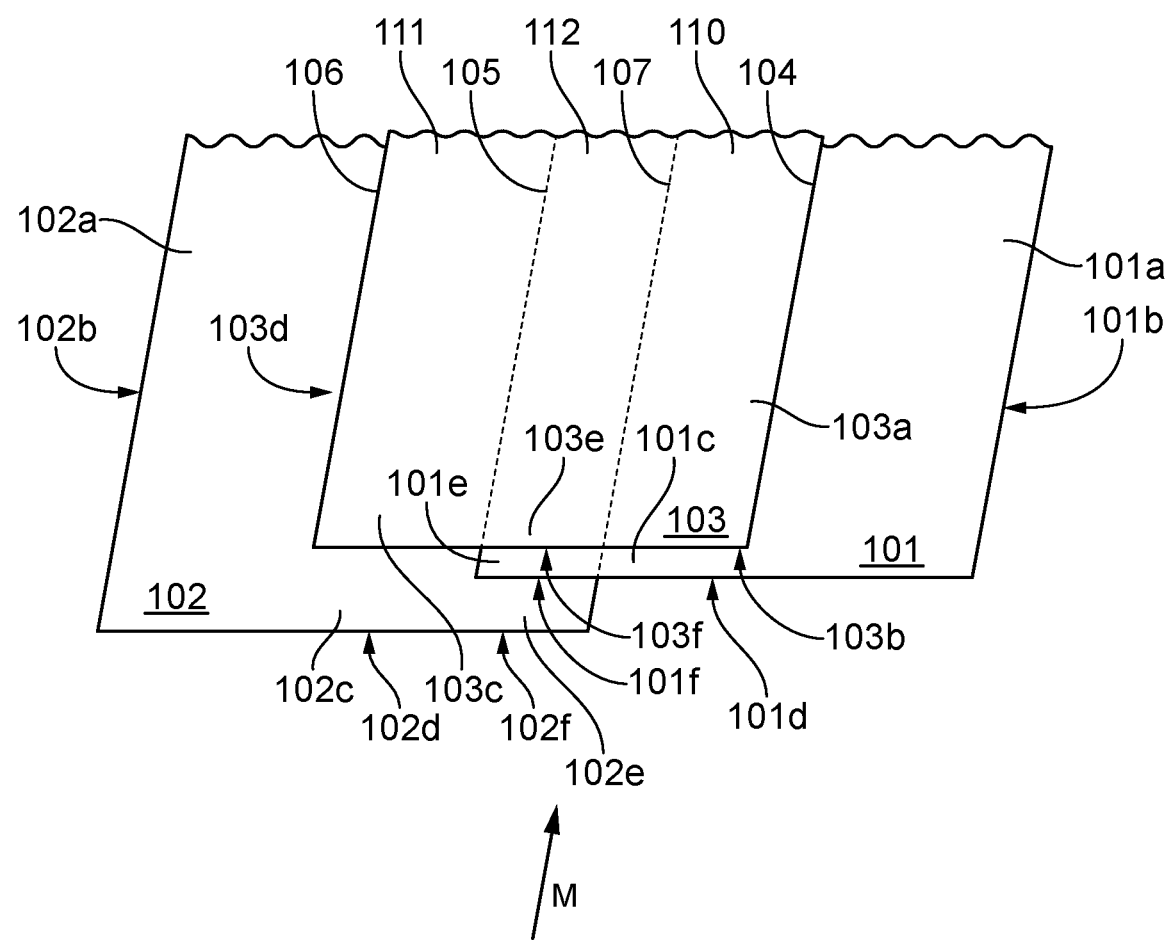
FIG. 2 illustrates a schematic perspective view providing the arrangement of superposed flexible membranes in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

The term "bond," refers to connecting two or more flexible membranes to form an impermeable fluid separation, at a localized portion of the two or more flexible membranes, by the application of heating sealing, welding, gluing, laser welding, or any combination thereof.

The term "flexible membrane" refers most commonly to plastics, and thermoplastics in particular, such as co-laminates of polyethylene and co-laminates of polyethylene and nylon, but also includes any membrane capable of forming an impermeable barrier.

The term "pre-printing" refers to the application of fluidic material having a high thermal resistance to predetermined portions of the surface of a thermoplastic sheet to form localized points of separation between adjacent thermoplastic sheets, after heat sealing occurs.

The term "register" refers to precisely locating a pretreated surface of a thermoplastic sheet with respect to the two bonding portions forming either side of a fluid chamber, such that the check valve and related components operate in a manner consistent with the design intent.

Figure 5:
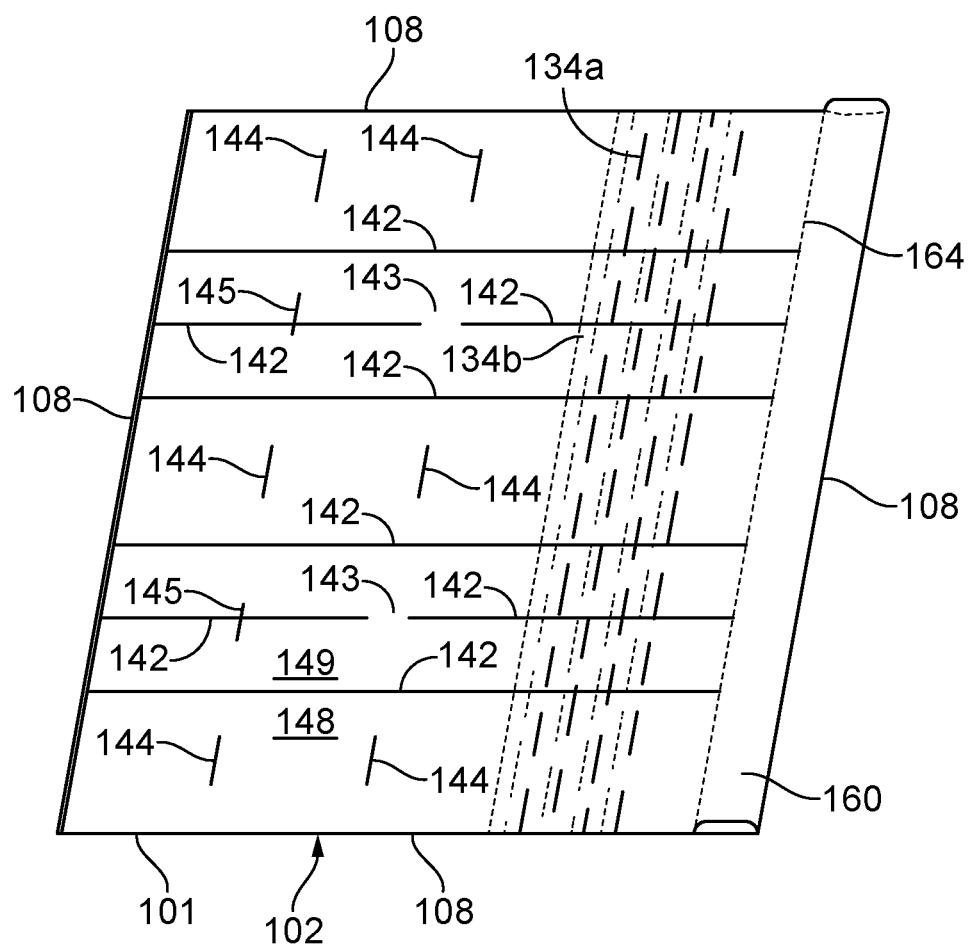
FIG. 5 illustrates a schematic perspective view of manufactured roll stock in accordance with an embodiment of present invention.
Figure 6:
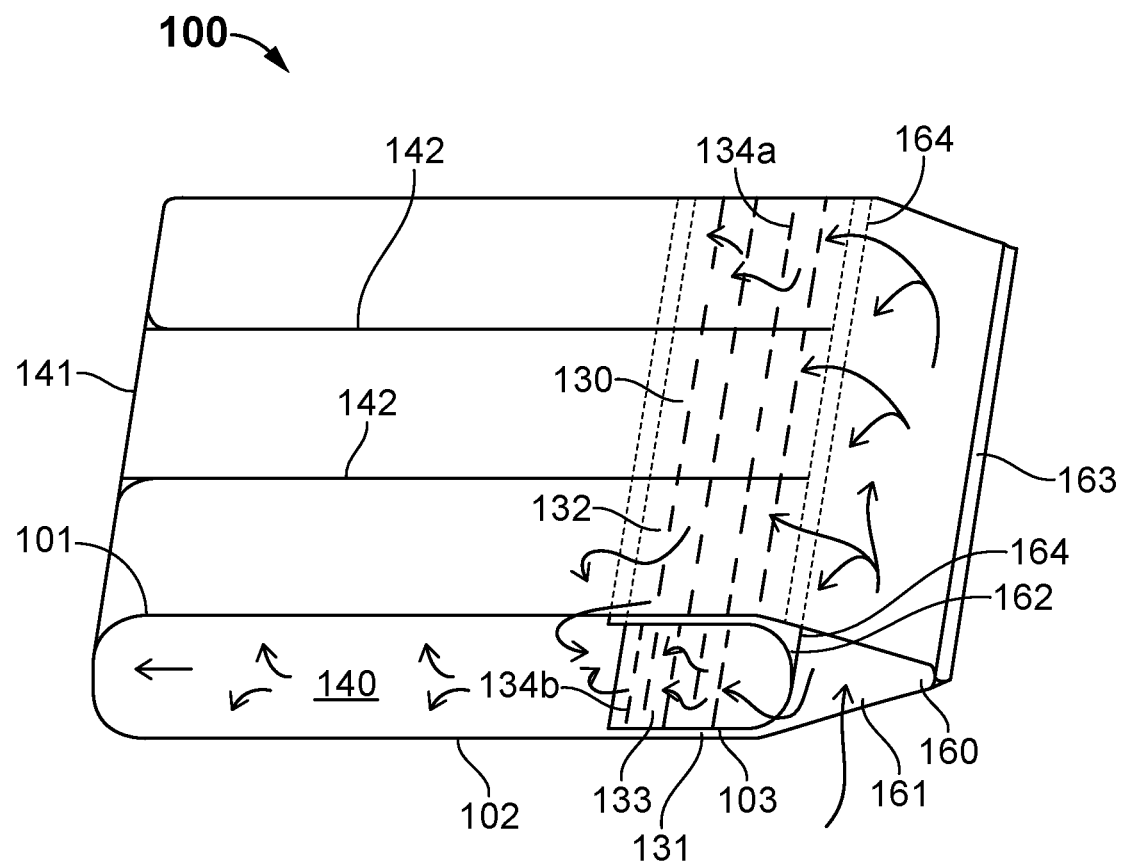
FIG. 6 illustrates an inflated fluid container with check valve product according to an embodiment of the present invention.
Figure 7:
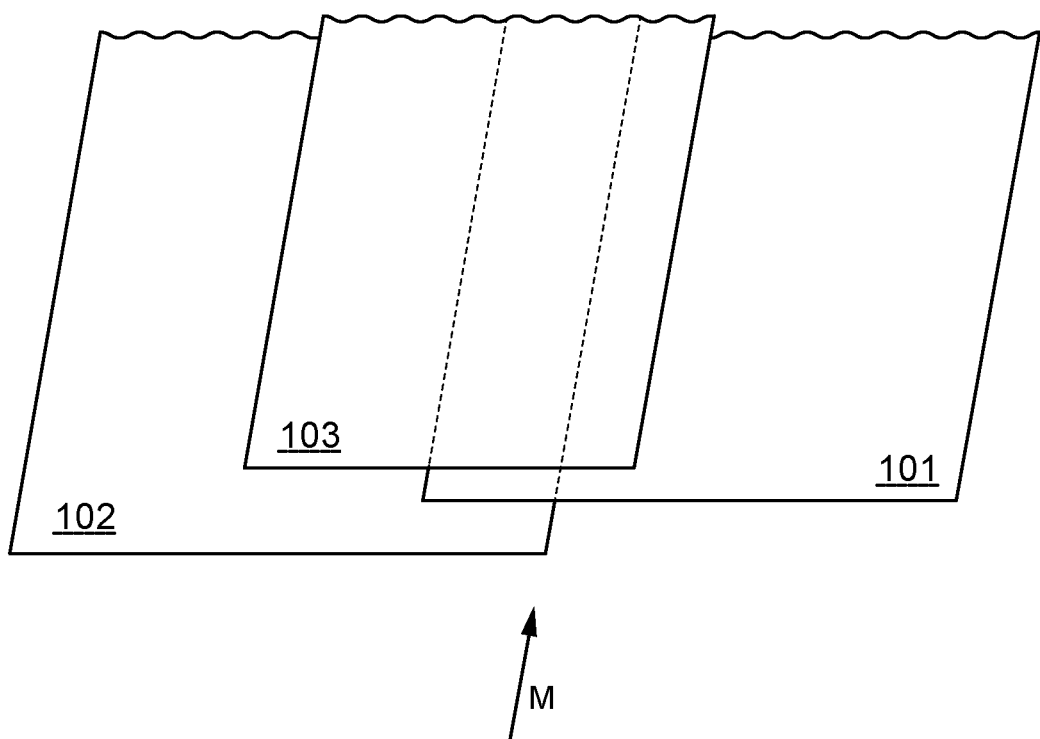
FIG. 7 illustrates a schematic perspective view providing the arrangement of superposed flexible membranes in accordance with an embodiment of the present invention.
Figure 8:
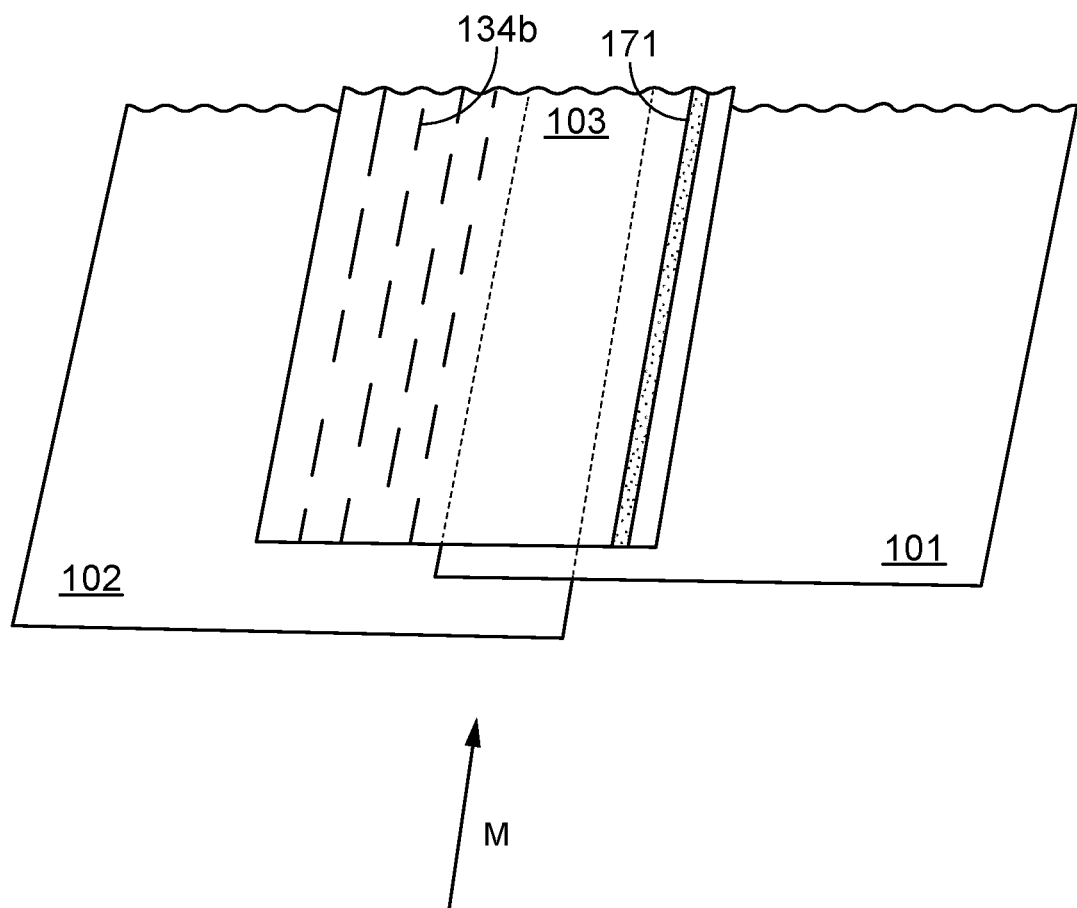
FIG. 8 illustrates a schematic perspective view providing the arrangement of a plurality of bonded portions in accordance with an embodiment of the present invention.
Figure 12:
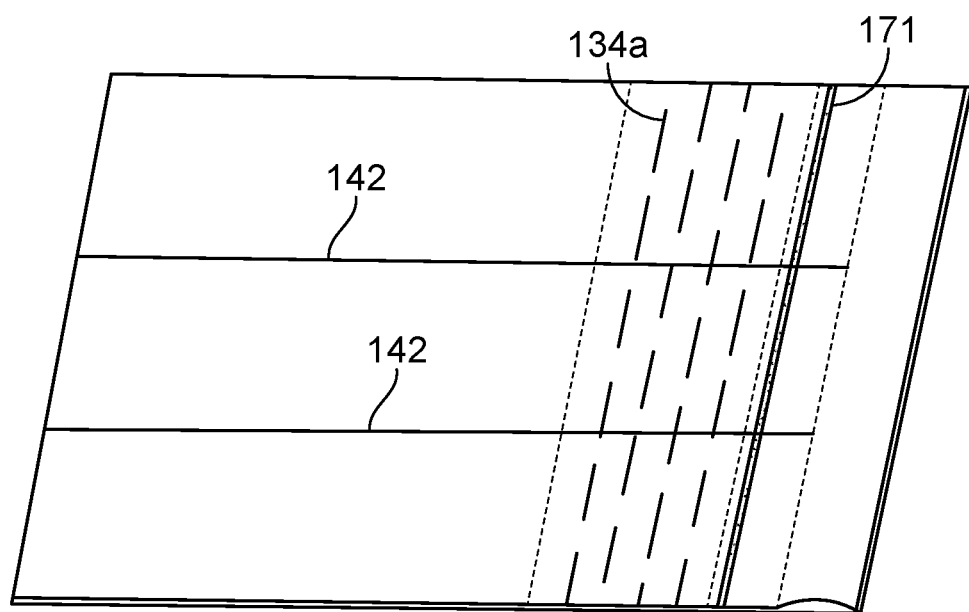
FIG. 12 illustrates a schematic perspective view of manufactured roll stock in accordance with an embodiment of present invention.
Figure 13:
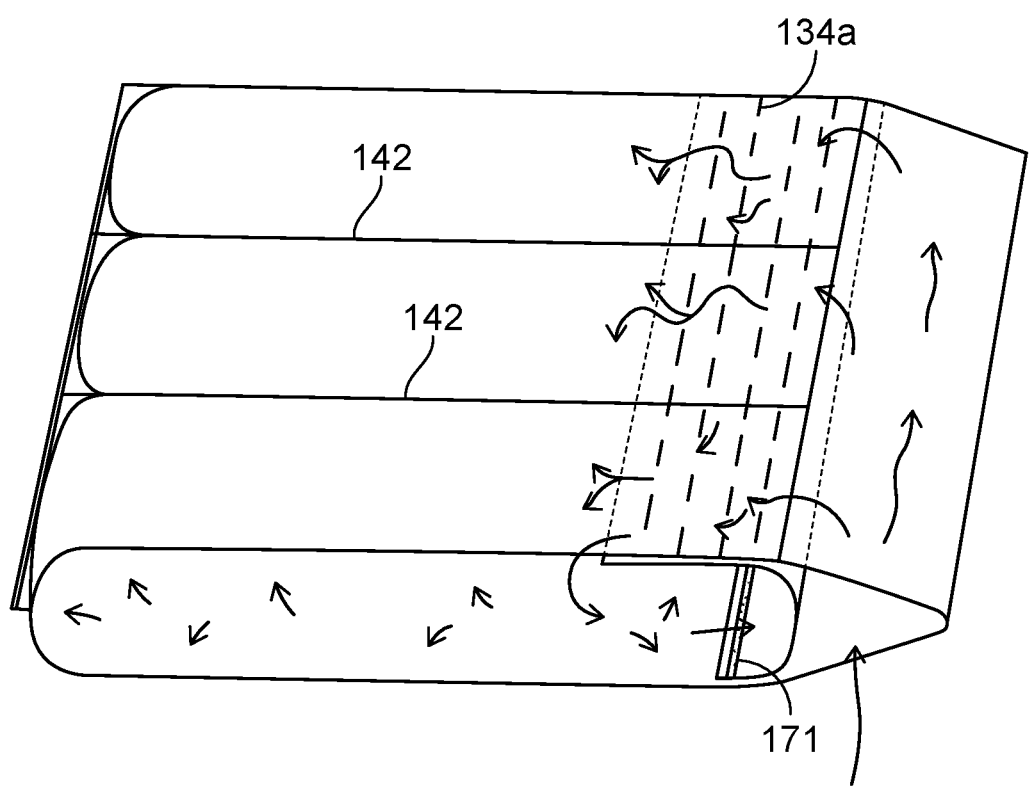
FIG. 13 illustrates an inflated fluid container with check valve product according to an embodiment of the present invention.
Figure 14:
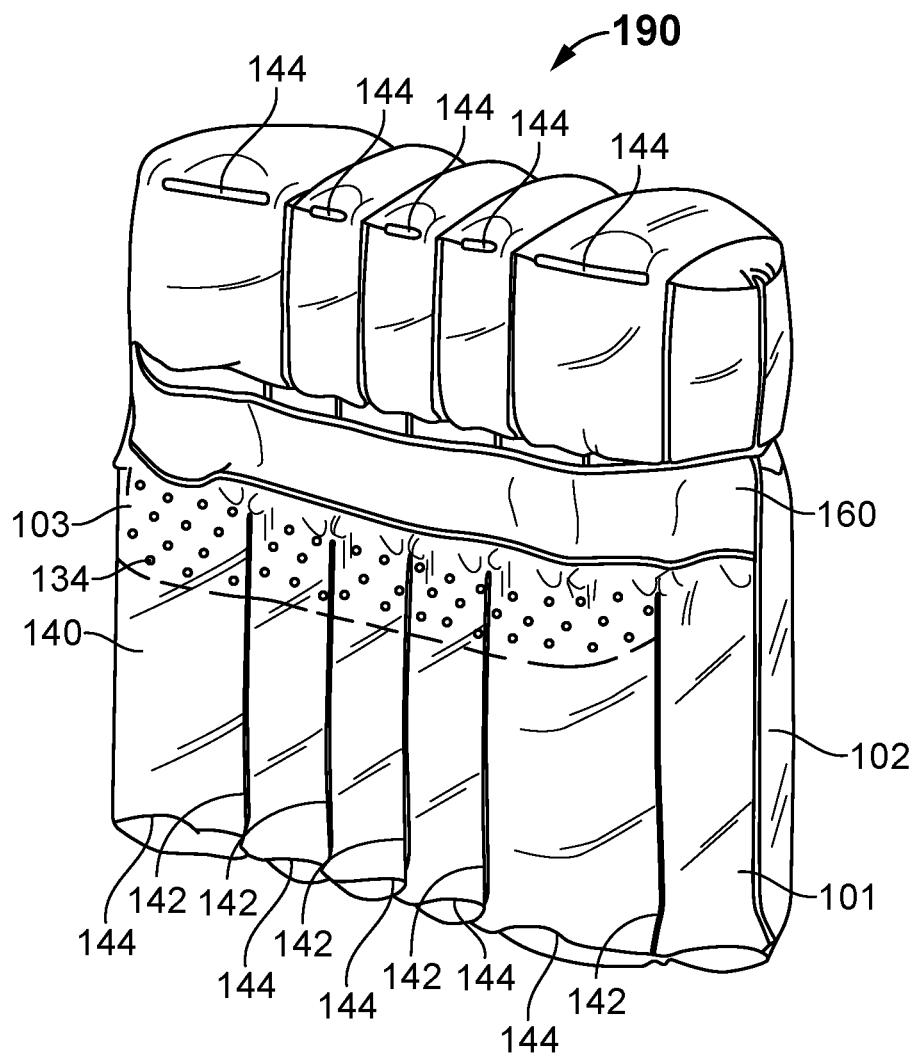
FIG. 14 illustrates a perspective view of a rectangular fluid container product.

As is illustrated in FIGS. 2 through 14, a fluid container apparatus, system and method is generally shown as element 100. Fluid container 100 may take the form of either roll stock, as represented in FIGS. 5 and 12, or a modified roll stock embodied as a rectangular fluid container product 190 for inserting a good to be shipped therein, as represented in FIG. 14. Referring to FIG. 6, fluid container 100 may include one or more chambers 140, a channel 160, a first check valve assembly 130, and a second check valve assembly 131. Referring to FIG. 13, fluid container 100 may alternatively include a continuous flexible membrane 171. Fluid container 100 may further include first, second, and third flexible membranes, 101, 102, and 103, respectively, as may be seen in FIGS. 1-4. In an alternative embodiment, fluid container 100 may include a continuous flexible membrane 170 and third flexible membrane 103, as may be seen in FIGS. 9 and 10. Moreover, third flexible membrane 103 may be alternated to facilitate ease of manufacturing, including but not limited to being formed from separate sheets and bonded together. As will be appreciated by one skilled in the art, the fluid container 100 may include flexible-membrane materials derived from hydrocarbons, or alternative materials, such as renewable bio-sourced matter. By the same token, one skilled in the art will recognize that fluid container 100 may be inflated using any inert gas, including air.

Referring now to FIGS. 2-6, fluid container 100 may be formed from flat sheets of prefabricated flexible membrane, namely first, second, and third flexible membranes, 101, 102, and 103, respectively. The initially flat sheets may be cut to size and superposed in the manner shown in FIG. 2, to be fed in a manufacturing flow direction indicated by an arrow M. On one side, first flexible membrane 101 may include a first inner chamber surface 101*a*, a first inner valve surface 101*c*, and a first inner channel surface 101*e*. On an opposite side, first flexible membrane 101 may include a first outer chamber surface 101*b*, a first outer valve surface 101*d*, and a first outer channel surface 101*f*. An upper exterior edge 105 may be disposed at an end of the first flexible membrane 101. In a similar manner, one side of second flexible membrane 102 may include a second inner chamber surface 102*a*, a second inner valve surface 102*c*, and a second inner channel surface 102*e*. On an opposite side, second flexible membrane 102 may include a second outer chamber surface 102*b*, a second outer valve surface 102*d*, and a second outer channel surface 102*f*. Furthermore, a lower exterior edge may be disposed at an end of the second flexible membrane 102. Similarly, one side of third flexible membrane 103 may include a third upper chamber surface 103*a*, a third lower chamber surface 103*c*, and a third middle chamber surface 103*e*. On an opposite side, third flexible membrane 103 may include a third upper valve surface 103*b*, a third lower valve surface 103*d*, and a third middle channel surface 103*f*. Additionally, third flexible membrane 103 may include an upper interior edge 104 at one end, and a lower interior edge 106 formed at an opposite end.

Importantly, the aforementioned surfaces of first, second, and third flexible membranes, 101, 102, and 103 are defined by each membrane's orientation and superposition with respect to each other. These defined surfaces may vary in area and linear dimension, depending on the particular application and end result desired. For example, a first overlap portion 110 depends on the linear dimension defined between the upper interior edge 104 and the lower exterior edge 107. Similarly, a second overlap portion 111 depends on the linear dimension defined between the upper exterior edge 105 and the lower interior edge 106. And furthermore, a middle overlap portion 112 depends on the linear dimension defined between the upper exterior edge 105 and the lower exterior edge 107.

Figure 3:
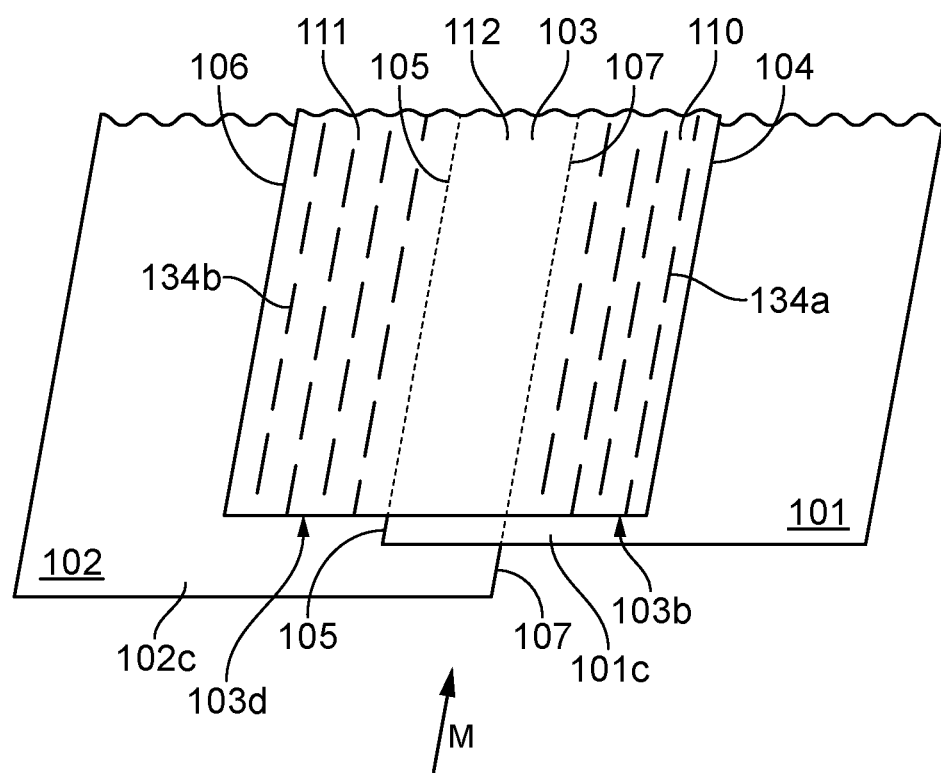
FIG. 3 illustrates a schematic perspective view providing the arrangement of a plurality of bonded portions in accordance with an embodiment of the present invention.

Referring now to FIG. 3, a plurality of upper bonded portions 134*a* may be formed on the first overlap portion 110, and a plurality of lower bonded portions 134*b* may be formed on the second overlap portion 112. These bonded portions 134*a*, 134*b* are shown as linear segments oriented so that the broad portion of each segment faces the direction of fluid flow, as will be described in more detail. The bonded portions 134*a*, 134*b* may be of any shape, oriented with respect to the direction of fluid flow in any orientation, and arrayed in any formation on the first and second overlap portions 110, 112. The bonded portions 134*a*, 134*b* may be formed between the respective membranes to couple the membranes at localized portions, to form an impermeable barrier that operates to inhibit the flow of fluid across the localized portion.

Figure 4:
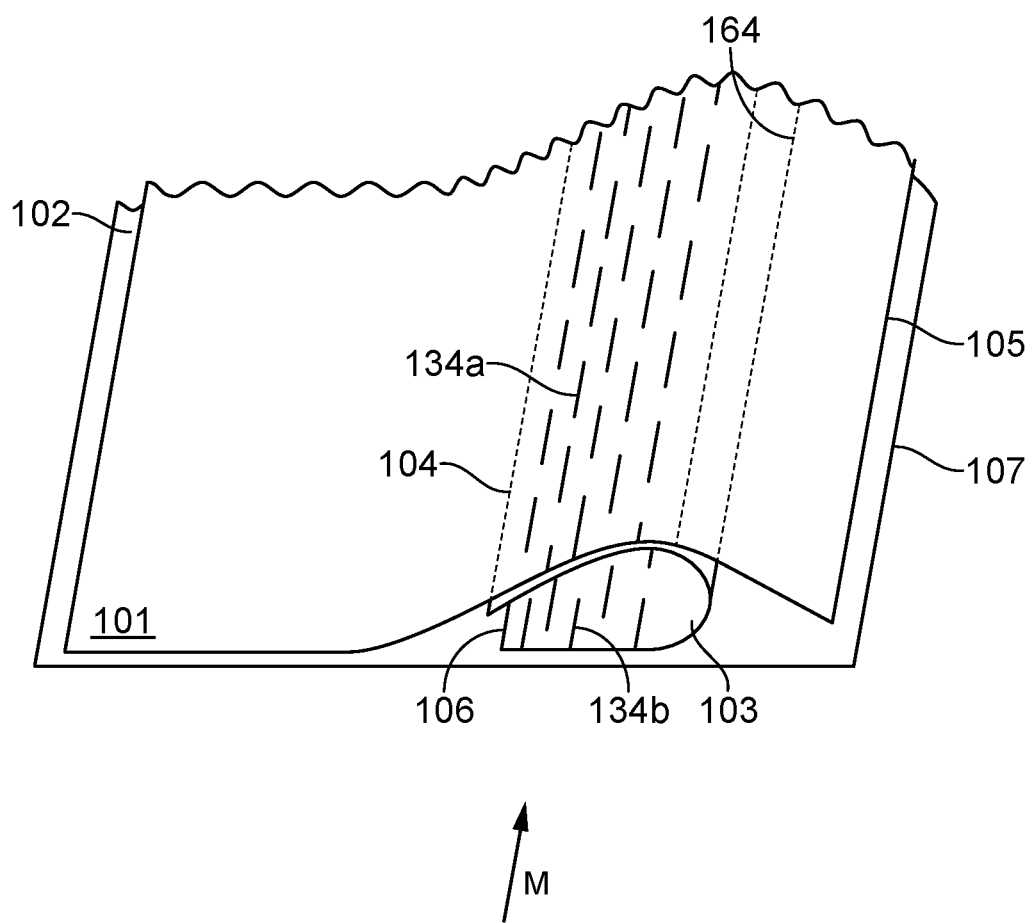
FIG. 4 illustrates a schematic perspective view showing the folded orientation of a third flexible membrane in accordance with an embodiment of the present invention.

Referring now to FIG. 4, the third flexible membrane 103 is shown folded over such that upper interior edge 104 substantially superposes lower interior edge 106, forming an apex 164 along a portion of the third middle chamber surface 103*e*. As a result, first flexible membrane 101 substantially superposes second flexible membrane 102 such that upper exterior edge 105 may be positioned adjacent to lower exterior edge 107.

Referring now to FIGS. 5 and 6, first and second flexible membranes 101, 102 are bonded along a periphery 108 that may include a channel inlet 161. First and second flexible membranes 101, 102 may further form at least one chamber 140 and a channel 160. It should be noted that FIG. 5 shows a version of roll stock, which may be further modified through manufacturing processes to include one or more side portions 142, one or more pathways 143, one or more middle articulation points 144, and one or more side articulation points 145; the roll stock may or may not include these features. In an alternative embodiment, one or more middle articulation points 144 may extend across the entire width of a chamber 140 to prevent fluid from entering a portion of the chamber. The side portions 142 may form a continuous bond through all membranes lying therein, and the side portions terminate on one end defined by the intersection of the side portions 142 with apex 164. In another embodiment, the side portions 142 form nonlinear bonds, including but not limited to, bonds forming arcuate shapes, ellipsoidal shapes, and shapes generally disposed non-orthogonally with respect to the fluid container 100. In one embodiment, a plurality of chambers 140 may include similarly-distanced respective side portions 142, so that the respective volume of each chamber 140 is about the same. In an alternative embodiment shown in FIG. 5, a wide chamber 148 may be formed, having side portions 142 spaced apart at a different dimension then the side portions that form a narrow chamber 149. One skilled in the art will appreciate that side portions 142 may be formed in any manner suitable for the intended application and good to be stored within fluid container 100.

Figure 9:
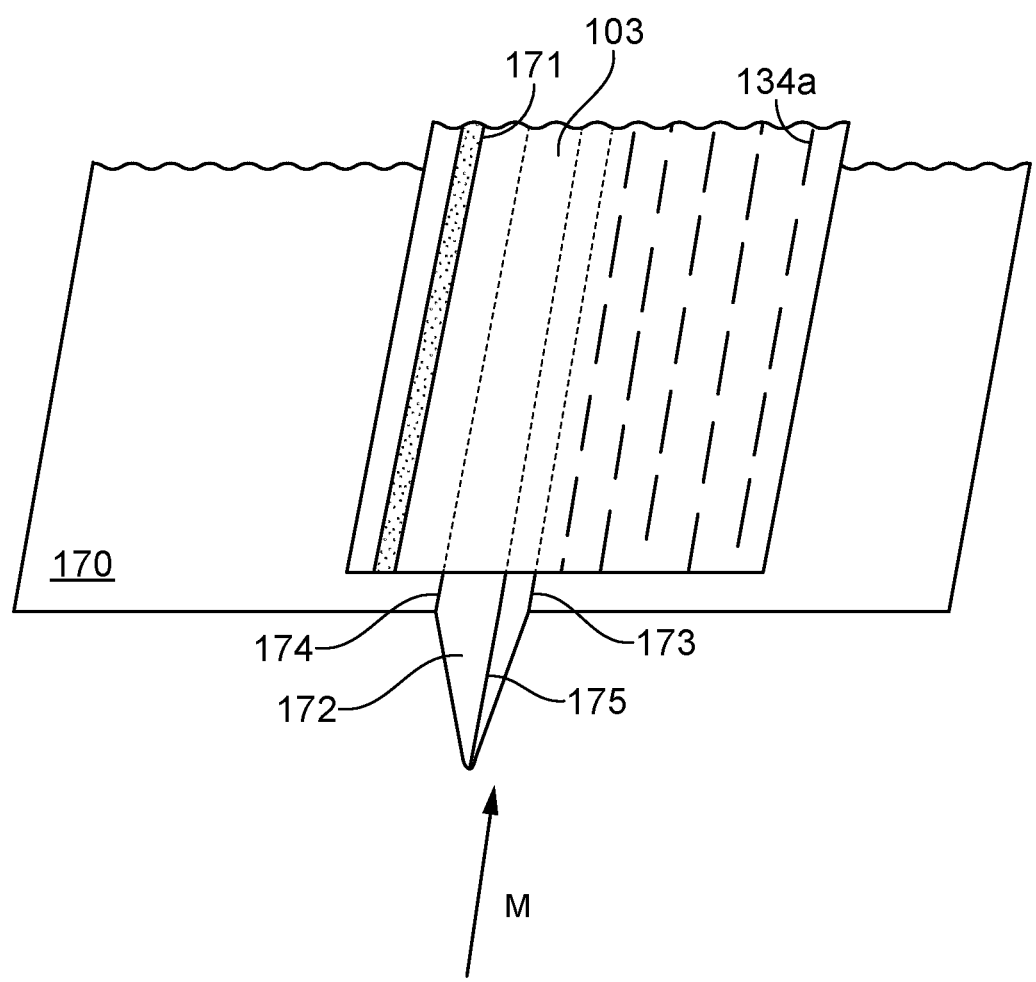
FIG. 9 illustrates a schematic perspective view of a partially formed roll stock having a continuous outer membrane with an indented end portion provided along the channel, in accordance with an embodiment of the present invention.
Figure 10:
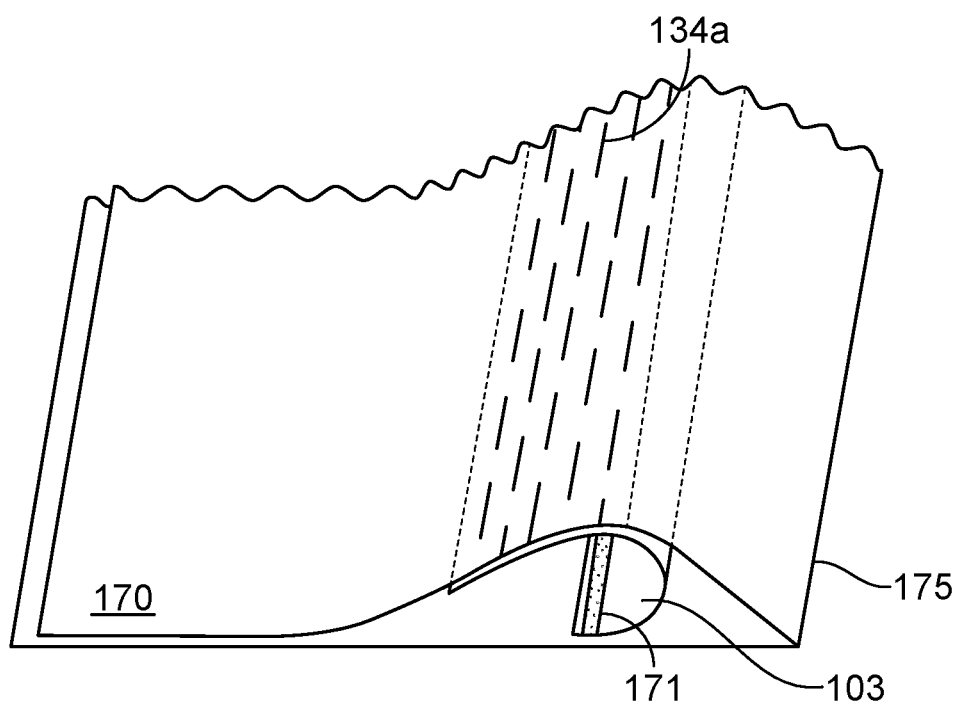
FIG. 10 illustrates a schematic perspective view showing the folded orientation of a third flexible membrane in accordance with an embodiment of the present invention.
Figure 11:
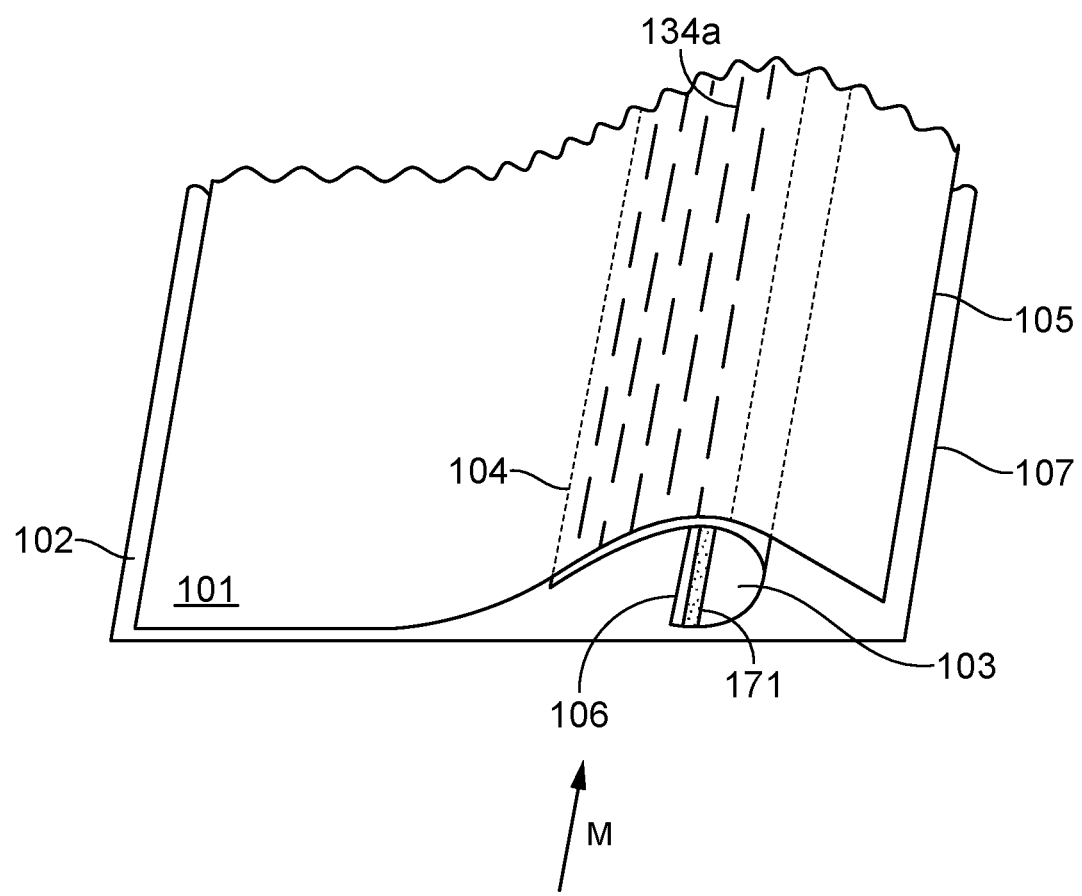
FIG. 11 illustrates a schematic perspective view showing the folded orientation of a third flexible membrane in accordance with an embodiment of the present invention.

Referring to FIG. 6, a fluid container 100 is shown. Fluid container 100 may be configured to receive compressed fluid from the channel inlet 161, as is represented by the flow arrow therein. Channel 160 comprises bulkhead 162 formed at the third middle channel surface 103*f*, first inner channel surface 101*e*, and second inner channel surface 102*e*. In one embodiment, upper exterior edge 105 and lower exterior edge 107 are bonded together to form end portion 163; in an alternative embodiment, as shown in FIG. 9, channel 160 is a preconnected channel 172, formed by the continuous flexible membrane 170, where end portion 163 is formed from a single sheet from first, second, and third creases 173, 174, and 175, respectively. In the latter embodiment, associated components such as chamber 140 are also formed using continuous flexible membrane 170. FIG. 6 also shows first and second valve assemblies 130 and 131, which may include first and second valve bodies 132 and 133, respectively. First valve body 130 may be formed by third upper valve surface 103*b*, first inner valve surface 101*c* and may include a plurality of upper bonded portions 134*a*. Second valve body 131 may be formed by third lower valve surface 103*d*, second inner valve surface 102*c* and may include a plurality of lower bonded portions 134*b*. In an alternative embodiment, as shown in FIG. 13, a valve body including plurality of bonded portions 134*a* is formed on one side of the fluid container 100; the other side of fluid container 100 then may include continuously bonded seal 171, which restricts fluid flow through that side. One or more chambers 140 may similarly be formed by the first inner chamber surface 101*a*, the third upper chamber surface 103*a*, the third middle chamber surface 103*e*, the third lower chamber surface 103*c*, and the second inner chamber surface 102*a*. Furthermore, the one or more chambers terminate along a closed bottom portion 141.

Referring again to FIG. 6, as compressed fluid enters fluid container 100, channel 160 begins to inflate. As compressed fluid continues to enter fluid container 100, fluid permeates through first and second valve bodies 132 and 133, to then flow into the space defined by one or more chambers 140, resulting in the inflation and pressurization of the one of more chambers 140. Once the one or more chambers 140 are sufficiently filled, pressurization of chamber 140 urges the valve bodies to close along the fluid path, which restricts fluid flow by prohibiting fluid exfiltration through the first and second check valve assemblies. Generally speaking, the directional arrows shown in FIGS. 6 and 13 represent streamlines of fluid permeating through the fluid container 100 as it inflates. Importantly, the design of fluid container 100 obviates the need of continuous seal 17 as shown in FIG. 1 PRIOR ART, thereby providing check valve assemblies 130, 131, with the capability of at least doubling the air flow volume (e.g., cubic feet per minute, or CFM), and a corresponding reduction in the required inflation time to at most half of the time required by conventional inflatable packing. The fluid container 100 is an article of manufacture or product that can be made by the method of the present invention. Advantageously, the fluid container apparatus, system and method 100 eliminates layers and structures thereby reducing material costs, waste, and additional steps in the manufacture.

Referring to FIG. 14, a rectangular fluid container product 190 is shown in an inflated configuration, wherein a plurality of chambers 140 are fully inflated. Rectangular fluid container product 190 may include modifications to roll stock, for example with one or more side portions 142 and one or more middle articulation points 144, as previously explained with reference to FIG. 5. The plurality of bonded portions 134, third flexible membrane 103, and related components may be located substantially as shown, but also may be located along a different portion of the rectangular fluid container product 190. Goods may be stored in an interior space surrounded by chambers 140 through an opening (not shown) formed near channel 160.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing roll stock, comprising the steps of:
    providing first and second flexible membranes, each of said first and second flexible membranes comprising:
        an outer surface having an outer channel portion, an outer chamber portion, and an outer valve portion disposed therebetween, and
        an inner surface having an inner channel portion, an inner chamber portion, and an inner valve portion disposed therebetween,
        wherein each of said portions of said outer surface correspond to like portions of said inner surface,
        and wherein said inner channel portion of said first flexible membrane has an upper exterior edge, and said inner channel portion of said second flexible membrane has a lower exterior edge;
    providing a third flexible membrane comprising:
        an upper surface, and
        a lower surface having upper and lower valve portions, and a middle channel portion disposed therebetween, said upper valve portion having an upper interior edge, said lower valve portion having a lower interior edge disposed opposite said upper interior edge;
    superposing said first, second, and third flexible members forming:
        a first overlap portion comprising said upper valve portion of said third flexible membrane overlapping said inner valve portion of said first flexible membrane,
        a second overlap portion comprising said lower valve portion of said third flexible membrane overlapping said inner valve portion of said second flexible membrane, and
        a middle overlap portion comprising said outer channel portion of said first flexible membrane overlapping said inner channel portion of said second flexible membrane, wherein said middle channel portion of said lower surface of said third flexible membrane is defined by a distance between said upper exterior edge of said first flexible membrane and said lower exterior edge of said second flexible membrane;
    bonding said first overlap portion at a plurality of upper bonded locations to form a first check valve assembly;
    bonding said second overlap portion at a plurality of lower bonded locations to form a second check valve assembly;
    folding said upper surface to superpose said upper interior edge above said lower interior edge to form an apex bisecting said middle channel portion of said third flexible membrane; and
    bonding said first and second flexible membranes along a periphery having a channel inlet configured to receive compressed inert gas, thereby forming:
        at least one chamber comprising said chamber portions of said first and second membranes and said upper surface of said third flexible membrane, and
        a channel comprising said inner channel portions of said first and second flexible membranes, said middle channel portion of said third flexible membrane, and said channel inlet.

2. A fluid container made by the method of claim 1.

3. The method as recited in claim 1, further comprising the step of:
    bonding said first and second flexible membranes together at predetermined side portions to form a plurality of chambers.

4. A fluid container made by the method of claim 1.

5. The method as recited in claim 1, further comprising the step of:
    bonding said first and second flexible membranes together at predetermined side portions to form a plurality of chambers.

6. A fluid container made by the method of claim 5.

7. A fluid container made by the method of claim 5.

8. A method of manufacturing roll stock, comprising the steps of:
    providing first and second flexible membranes, each of said first and second flexible membranes comprising:
        an outer surface having an outer channel portion, an outer chamber portion, and an outer valve portion disposed therebetween, and
        an inner surface having an inner channel portion, an inner chamber portion, and an inner valve portion disposed therebetween,
        wherein each of said portions of said outer surface correspond to like portions of said inner surface,
        and wherein said inner channel portion of said first flexible membrane has an upper exterior edge, and said inner channel portion of said second flexible membrane has a lower exterior edge;

providing a third flexible membrane comprising:
an upper surface, and
a lower surface having upper and lower valve portions, and a middle channel portion disposed therebetween, said upper valve portion having an upper interior edge, said lower valve portion having a lower interior edge disposed opposite said upper interior edge;

superposing said first, second, and third flexible members forming:
a first overlap portion comprising said upper valve portion of said third flexible membrane overlapping said inner valve portion of said first flexible membrane,
a second overlap portion comprising said lower valve portion of said third flexible membrane overlapping said inner valve portion of said second flexible membrane, and
a middle overlap portion comprising said outer channel portion of said first flexible membrane overlapping said inner channel portion of said second flexible membrane, wherein said middle channel portion of said lower surface of said third flexible membrane is defined by a distance between said upper exterior edge of said first flexible membrane and said lower exterior edge of said second flexible membrane;

bonding said first overlap portion at a plurality of upper bonded locations to form a first check valve assembly;

bonding said second overlap portion to form a continuous seal;

folding said upper surface to superpose said upper interior edge above said lower interior edge to form an apex bisecting said middle channel portion of said third flexible membrane; and bonding said first and second flexible membranes along a periphery having a channel inlet configured to receive compressed inert gas, thereby forming:
at least one chamber comprising said chamber portions of said first and second flexible membranes and said upper surface of said third flexible membrane, and
a channel comprising said inner channel portions of said first and second flexible membranes, said middle channel portion of said third flexible membrane, and said channel inlet.

* * * * *